United States Patent
Mandel et al.

(10) Patent No.: US 7,280,771 B2
(45) Date of Patent: Oct. 9, 2007

(54) MEDIA PASS THROUGH MODE FOR MULTI-ENGINE SYSTEM

(75) Inventors: Barry Paul Mandel, Fairport, NY (US); Edward Wooten, Pittsford, NY (US); William F. Blitz, Webster, NY (US)

(73) Assignee: Xerox Corporation, Stamford, CT (US)

( * ) Notice: Subject to any disclaimer, the term of this patent is extended or adjusted under 35 U.S.C. 154(b) by 153 days.

(21) Appl. No.: 11/287,177

(22) Filed: Nov. 23, 2005

(65) Prior Publication Data

US 2007/0116479 A1    May 24, 2007

(51) Int. Cl.
*G03G 15/00*    (2006.01)

(52) U.S. Cl. .............................. 399/9; 399/16; 399/18; 399/19; 399/20

(58) Field of Classification Search .................... 399/9, 399/16, 17, 18, 19, 20, 21, 22
See application file for complete search history.

(56) References Cited

U.S. PATENT DOCUMENTS

| | | |
|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Hoang Ngo
(74) *Attorney, Agent, or Firm*—Fay Sharpe LLP; Eugene Palazzo

(57) ABSTRACT

An integrated printing system is provided comprising a first image marking engine and a second image marking engine. The first and second image marking engines can be serially arranged with one another in a first operating mode. The first operating mode includes marking and passing of media to and from the first and second marking engines. A control system is provided for detecting a failure within one of the first and second image marking engines. A second operating mode is provided wherein the control system detects the failure and enables passing of the media through one of the first and second marking engines and marking of the media in another of the first and second marking engines when the failure is of a specified type.

21 Claims, 2 Drawing Sheets

U.S. PATENT DOCUMENTS

| | | |
|---|---|---|
| 5,778,377 A | 7/1998 | Marlin et al. |
| 5,884,910 A | 3/1999 | Mandel |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |
| 6,384,918 B1 | 5/2002 | Hubble, III et al. |
| 6,450,711 B1 | 9/2002 | Conrow |
| 6,476,376 B1 | 11/2002 | Biegelsen et al. |
| 6,476,923 B1 | 11/2002 | Cornell |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,748,186 B1 * | 6/2004 | Skrainar et al. ............... 399/81 |
| 6,819,906 B1 | 11/2004 | Herrmann et al. |
| 6,925,283 B1 | 8/2005 | Mandel et al. |
| 6,959,165 B2 | 10/2005 | Mandel et al. |
| 2002/0078012 A1 | 6/2002 | Ryan et al. |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2006/0285857 A1 * | 12/2006 | Swift ............................ 399/8 |

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/137,273, filed May 25, 2005, Anderson et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/212,367, filed Aug. 26, 2005, Anderson et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/235,979, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/236,099, filed Sep. 27, 2005, Anderson et al.

* cited by examiner

MEDIA PASS THROUGH MODE FOR MULTI-ENGINE SYSTEM

BACKGROUND

The present exemplary embodiment relates to a plurality of image marking engines or image recording apparatuses providing a multifunctional and/or expandable printing system. It finds particular application in conjunction with integrated and/or serially configured printing modules consisting of several marking engines, each having the same or different printing capabilities, and will be described with particular reference thereto. However, it is to be appreciated that the present exemplary embodiment is also amenable to other like applications.

Various apparatuses for recording images on sheets have heretofore been put into practical use. For example, there are copying apparatuses of the type in which the images of originals are recorded on sheets through a photosensitive medium or the like, and printers in which image information transformed into an electrical signal is reproduced as an image on a sheet by an impact system (the type system, the wire dot system or the like) or a non-impact system (the thermosensitive system, the ink jet system, the laser beam system or the like).

The marking engine of an electronic reprographic printing system is frequently an electrophotographic printing machine. In such a machine, a photoconductive belt is charged to a substantially uniform potential to sensitize the belt surface. The charged portion of the belt is thereafter selectively exposed. Exposure of the charged photoconductive belt or member dissipates the charge thereon in the irradiated areas. This records an electrostatic latent image on the photoconductive member corresponding to the informational areas contained within the original document being reproduced. After the electrostatic latent image is recorded on the photoconductive member, the latent image on the photoconductive member is subsequently transferred to a copy sheet. The copy sheet is heated to permanently affix the toner image thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complementary thereto. This process is repeated a plurality of cycles for differently colored images and their respective complementarily colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid or a powder material.

In the process of black and white printing, the copy sheet is advanced from an input tray to a path internal the electrophotographic printing machine where a toner image is transferred thereto and then to an output catch tray for subsequent removal therefrom by the machine operator. In the process of multi-color printing, the copy sheet moves from an input tray through a recirculating path internal the printing machine where a plurality of toner images is transferred thereto and then to an output catch tray for subsequent removal. With regard to multi-color printing, as one example, a sheet gripper secured to a transport receives the copy sheet and transports it in a recirculating path enabling the plurality of different color images to be transferred thereto. The sheet gripper grips one edge of the copy sheet and moves the sheet in a recirculating path so that accurate multi-pass color registration is achieved. In this way, magenta, cyan, yellow, and black toner images are transferred to the copy sheet in registration with one another.

Additionally, it is common practice to record images not only on one surface of the sheet, but also on both surfaces of a sheet. Copying or printing on both sides of a sheet decreases the number of sheets used from the viewpoint of saving of resources or filing space. In this regard as well, a system has been put into practical use whereby sheets having images recorded on a first surface thereof are once accumulated and after the recording on the first surface is completed, the accumulated sheets are then fed and images are recorded on a second surface thereof. However, this system is efficient when many sheets having a record of the same content are to be prepared, but is very inefficient when many sheets having different records on both surfaces thereof are to be prepared. That is, when pages 1, 2, 3, 4, . . . are to be prepared, odd pages, i.e. pages 1, 3, 5, . . . , must first be recorded on the first surface of the respective sheets, and then these sheets must be fed again and even pages 2, 4, 6, . . . must be recorded on the second surface of the respective sheets. If, during the second feeding, multiplex feeding or jam of sheets should occur, the combination of the front and back pages may become mixed, thereby necessitating recording be done over again from the beginning. To avoid this, recording may be effected on each sheet in such a manner that the front and back surfaces of each sheet provide the front and back pages, respectively, but this takes time for the refeeding of sheets and the efficiency is reduced. Also, in the prior art methods, the conveyance route of sheets has been complicated and further, the conveyance route has unavoidably involved the step of reversing sheets, and this has led to extremely low reliability of sheet conveyance.

Also, there exist further requirements to record two types of information on one surface of a sheet in superposed relationship. Particularly, recently, coloring has advanced in various fields and there is also a desire to mix, for example, color print with black print on one surface of a sheet. As a simple method for effecting a superposed relationship, there exists systems whereby recording is once effected in black, whereafter the developing device in the apparatus is changed from a black one to a color one, and recording is again effected on the same surface. This system requires an increase in time and labor.

Where two types of information are to be recorded on one surface of the same sheet in superposed relationship, sufficient care must be taken of the image position accuracy, otherwise the resultant copy may become very unsightly due to image misregistration or deviation from a predetermined image recording frame.

In recent years, the demand for even higher productivity and speed has been required of these image recording apparatuses. However, the respective systems have their own speed limits and if an attempt is made to provide higher speeds, numerous problems will occur and/or larger and more bulky apparatuses must be used to meet the higher speed demands. The larger and bulkier apparatuses, i.e. high speed printers, typically represent a very expensive and uneconomical apparatus. The expense of these apparatuses along with their inherent complexity can only be justified by the small percentage of extremely high volume printing customers.

In print systems having a serial tandem configuration where there are two marking engines connected together between, for example, a paper source and a finishing station if one engine experiences problems, then both engines are rendered inoperative until service arrives. Thus, utilization and run time are compromised.

The following applications, the disclosures of each being totally incorporated herein by reference are mentioned:

Application Ser. No. 11/212,367, filed Aug. 26, 2005, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

Application Ser. No. 11/235,979, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE";

Application Ser. No. 11/235,979, filed Sep. 27, 2005, entitled "PRINTING SYSTEM," by David G. Anderson, et al., and claiming priority to U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. application Ser. No. 10/761,522, filed Jan. 21, 2004, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/881,619, filed Jun. 30, 2004, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/917,768, filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106, filed Aug. 23, 2004, entitled "PRINTING SYSTEM WITH HORIZONTAL HIGHWAY AND SINGLE PASS DUPLEX," by Robert M. Lofthus, et al.;

U.S. application Ser. No. 10/924,113, filed Aug. 23, 2004, entitled "PRINTING SYSTEM WITH INVERTER DISPOSED FOR MEDIA VELOCITY BUFFERING AND REGISTRATION," by Joannes N. M. dejong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. application Ser. No. 10/924,459, filed Aug. 23, 2004, entitled "PARALLEL PRINTING ARCHITECTURE USING IMAGE MARKING ENGINE MODULES (as amended)," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. application Ser. No. 11/000,158, filed Nov. 30, 2004, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. application Ser. No. 11/000,258, filed Nov. 30, 2004, entitled "GLOSSING SYSTEM FOR USE IN A TIPP ARCHITECTURE," by Bryan J. Roof;

U.S. application Ser. No. 11/001,890, filed Dec. 2, 2004, entitled "HIGH RATE PRINT MERGING AND FINISHING SYSTEM FOR PARALLEL PRINTING," by Robert M. Lofthus, et al.

U.S. Pat. No. 6,925,283, issued Aug. 2, 2005, and U.S. Pat. No. 6,959,165, issued Oct. 25, 2005, entitled "HIGH PRINT RATE MERGING AND FINISHING SYSTEM FOR PRINTING," by Barry P. Mandel, et al.;

U.S. application Ser. No. 11/051,817, filed Feb. 4, 2005, entitled "PRINTING SYSTEMS," by Steven R. Moore, et al.;

U.S. application Ser. No. 11/069,020, filed Feb. 28, 2004, entitled "PRINTING SYSTEMS," by Robert M. Lofthus, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/089,854, filed Mar. 25, 2005, entitled "SHEET REGISTRATION WITHIN A MEDIA INVERTER," by Robert A. Clark, et al.;

U.S. application Ser. No. 11/090,498, filed Mar. 25, 2005, entitled "INVERTER WITH RETURN/BYPASS PAPER PATH," by Robert A. Clark;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/093,229, filed Mar. 29, 2005, entitled "PRINTING SYSTEM," by Paul C. Julien;

U.S. application Ser. No. 11/095,872, filed Mar. 31, 2005, entitled "PRINTING SYSTEM," by Paul C. Julien;

U.S. application Ser. No. 11/094,864, filed Mar. 31, 2005, entitled "PRINTING SYSTEM," by Jeremy C. deJong, et al.;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/109,558, filed Apr. 19, 2005, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. application Ser. No. 11/109,996, filed Apr. 20, 2005, entitled "PRINTING SYSTEMS," by Michael C. Mongeon, et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/122,420, filed May 5, 2005, entitled "PRINTING SYSTEM AND SCHEDULING METHOD," by Austin L. Richards;

U.S. application Ser. No. 11/136,821, filed May 25, 2005, entitled "AUTOMATED PROMOTION OF MONOCHROME JOBS FOR HLC PRODUCTION PRINTERS," by David C. Robinson;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. C-I-P application Ser. No. 11/137,273, filed May 25, 2005, entitled "PRINTING SYSTEM," by David G. Anderson, et al.;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/166,460, filed Jun. 24, 2005, entitled "GLOSSING SUBSYSTEM FOR A PRINTING DEVICE," by Bryan J. Roof, et al.;

U.S. application Ser. No. 11/166,763, filed Jun. 24, 2005, entitled "XEROGRAPHIC DEVICE STREAK FAILURE RECOVERY," by Bruce Thayer;

U.S. application Ser. No. 11/166,581, filed Jun. 24, 2005, entitled "MIXED OUTPUT PRINT CONTROL METHOD AND SYSTEM," by Joseph H. Lang, et al.;

U.S. application Ser. No. 11/166,961, filed Jun. 24, 2005, entitled "PRINTING SYSTEM SHEET FEEDER," by Steven R. Moore;

U.S. application Ser. No. 11/166,299, filed Jun. 24, 2005, entitled "PRINTING SYSTEM," by Steven R. Moore;

U.S. application Ser. No. 11/168,152, filed Jun. 28, 2005, entitled "ADDRESSABLE IRRADIATION OF IMAGES," by Kristine A. German, et al.;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/189,371, filed Jul. 26, 2005, entitled "PRINTING SYSTEM," by Steven R. Moore, et al.;

U.S. application Ser. No. 11/208,871, filed Aug. 22, 2005, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM", by Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS", by Goodman, et al.;

U.S. application Ser. No. 11/234,553, filed Sep. 23, 2005, entitled "MAXIMUM GAMUT STRATEGY FOR THE PRINTING SYSTEMS", by Michael C. Mongeon;

U.S. application Ser. No. 11/234,468, filed Sep. 23, 2005, entitled "PRINTING SYSTEM", by Hamby, et al.;

U.S. application Ser. No. 11/247,778, filed Oct. 11, 2005, entitled "PRINTING SYSTEM WITH BALANCED CONSUMABLE USAGE", by Radulski et al.

BRIEF DESCRIPTION

In accordance with one aspect of the present exemplary embodiment, an integrated printing system is provided comprising a first image marking engine and a second image marking engine. The first and second image marking engines can be serially arranged with one another in a first operating mode. The first operating mode includes marking and passing of media to and from the first and second marking engines. A control system is provided for detecting a failure within one of the first and second image marking engines. A second operating mode is provided wherein the control system detects the failure and enables passing of the media through one of the first and second marking engines and marking of the media in another of the first and second marking engines when the failure is of a specified type.

According to another embodiment, a method of printing media for an integrated printing system is provided, the method comprising a first marking engine and a second marking engine. The first and second image marking engines can be serially arranged with one another. The method further provides for feeding media from a feed source into at least one of the first and second image marking engines during a first operating mode. The first operating mode includes marking and passing of the media through the first and second marking engines. The method further provides for changing to a second operating mode including marking of the media through one of the first and second marking engines and passing the media through both of the first and second marking engines.

According to still another embodiment, an integrated printing system is provided comprising: a first image marking engine and a second image marking engine. The first and second image marking engines can be serially arranged with one another and having a first operating mode. The first operating mode includes marking and passing of media to and from the first and second marking engines. A second operating mode is provided and includes passing of the media through one of the first and second marking engines and marking of the media in another of the first and second marking engines.

DETAILED DESCRIPTION

Figure 1:
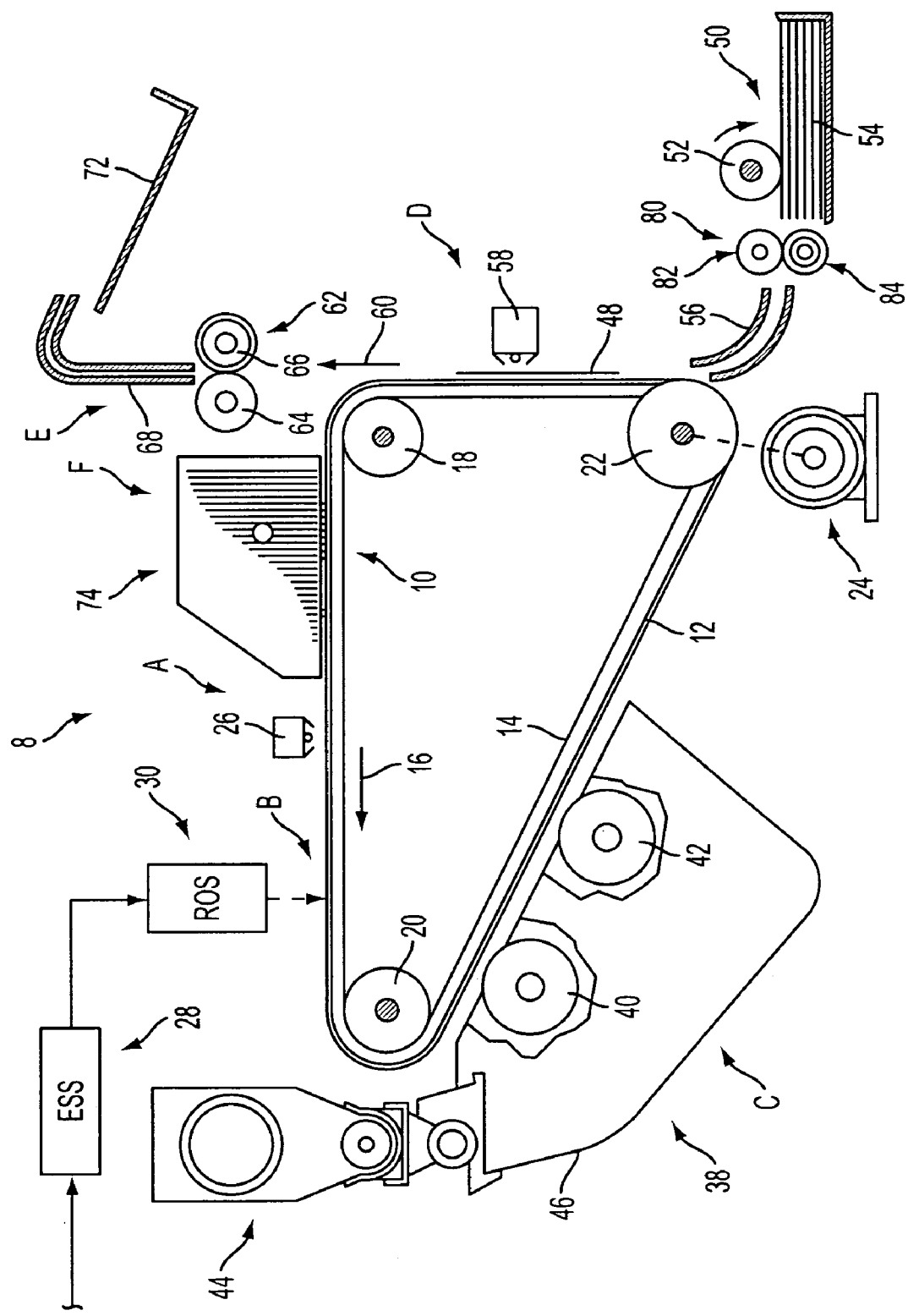
FIG. 1 is a schematic elevational view of an exemplary electrophotographic printing machine.

While the present printing apparatus and method will hereinafter be described in connection with exemplary embodiments, it will be understood that it is not intended to limit the embodiments. On the contrary, it is intended to cover all alternatives, modifications and equivalents as may be included within the spirit and scope of the embodiments as defined by the appended claims.

The embodiments, to be described below, comprise a plurality of Image Marking Engines (IME). The IMEs can be, for example, any type of ink-jet printer, a electrophotographic printer, a thermal head printer that is used in conjunction with heat sensitive paper, or any other apparatus used to mark an image on a substrate. The IMEs can be, for example, black only (monochrome) and/or color printers. Examples of different varieties of printers are shown in the Figures, but other varieties, types, alternatives, quantities, and combinations can be used within the scope of the exemplary embodiments. It is to be appreciated that, each of the IMEs can include an input/output interface, a memory, a marking cartridge platform, a marking driver, a function switch, a controller and a self-diagnostic unit, all of which can be interconnected by a data/control bus. Each of the IMEs can have a different processing speed capability.

Each marking engine can be connected to a data source over a signal line or link. The data source provides data to be output by marking a receiving medium. In general, the data source can be any of a number of different sources, such as a scanner, a digital copier, a facsimile device that is suitable for generating electronic image data, or a device suitable for storing and/or transmitting the electronic image data, such as a client or server of a network, or the internet, and especially the worldwide web. The data source may also be a data carrier such as a magnetic storage disk, CD ROM, or the like, that contains data to be output by marking. Thus, the data source can be any known or later developed source that is capable of providing scanned and/or synthetic data to each of the marking engines.

The link can be any known or later developed device or system for connecting the image data source to the marking engine, including a direct cable connection, a public switched telephone network, a wireless transmission channel, a connection over a wide area network or a local area network, a connection over an intranet, a connection over the internet, or a connection over any other distributed processing network or system. In general, the link can be any known or later developed connection system or structure usable to connect the data source to the marking engine. Further, it should be appreciated that the data source may be connected to the marking engine directly.

As shown in the FIGURES and to be described hereinafter, multiple marking engines can be coupled to, integrated, and/or serially connected with one another in a variety of combinations thereby enabling high speed printing and low run costs, with a high level of up time and system redundancy. Deactivating one of the marking engines, while utilizing the remaining marking engines, can be facilitated in integrated systems having bypass media transport paths (not illustrated). The bypass paths enable media sheets to go around the failed engine as the remaining engine(s) can still function. The following disclosure provides for a printing system that lacks a bypass path or has a non-functioning bypass path. Additionally, the disclosure provides for an alternative to a functioning bypass path or used in conjunction with the bypass path.

FIG. 1 schematically illustrates an exemplary electrophotographic printing machine 8 which generally employs a belt 10 having a photoconductive surface 12 deposited on a conductive ground layer 14. Preferably, photoconductive surface 12 is made from a photoresponsive material, for example, one comprising a charge generation layer and a transport layer. Conductive layer 14 can be made from a thin metal layer or metallized polymer film which is electrically grounded. Belt 10 moves in the direction of arrow 16 to advance successive portions of photoconductive surface 12 sequentially through the various processing stations disposed about the path of movement thereof. Belt 10 is entrained about stripping roller 18, tensioning roller 20 and drive roller 22. Drive roller 22 is mounted rotatably in engagement with belt 10. Motor 24 rotates roller 22 to advance belt 10 in the direction of arrow 16. Roller 22 is coupled to motor 24 by suitable means, such as a drive belt. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station A. At charging station A, a corona generating device, indicated generally by the reference numeral 26 charges the photoconductive surface 12 to a relatively high, substantially uniform potential. After photoconductive surface 12 of belt 10 is charged, the charged portion thereof is advanced through exposure station B.

At exposure station B, a controller or electronic subsystem (ESS), indicated generally by reference numeral 28, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 28 is a self-contained, dedicated minicomputer. The image signals transmitted to ESS 28 may originate from a computer, thereby enabling the electrophotographic printing machine to serve as a remotely located printer for one or more computers. Alternatively, the printer may serve as a dedicated printer for a high-speed computer. The signals from ESS 28, corresponding to the continuous tone image desired to be reproduced by the printing machine, are transmitted to ROS 30. ROS 30 can include a laser with rotating polygon mirror blocks. The ROS can illuminate the charged portion of photoconductive belt 20 at a resolution of about 300 or more pixels per inch. The ROS will expose the photoconductive belt to record an electrostatic latent image thereon corresponding to the continuous tone image received from ESS 28. As an alternative, ROS 30 may employ a linear array of light emitting diodes (LEDs) arranged to illuminate the charged portion of photoconductive belt 20 on a raster-by-raster basis.

In another embodiment, ESS 28 may be connected to a raster input scanner (RIS). The RIS has an original document positioned thereat. The RIS can include document illumination lamps, optics, a scanning drive, and photosensing elements, such as an array of charge coupled devices (CCD). The RIS captures the entire image from the original document and converts it to a series of raster scanlines which are transmitted as electrical signals to ESS 28. ESS 28 processes the signals received from the RIS and converts them to greyscale image intensity signals which are then transmitted to ROS 30. ROS 30 exposes the charged portion of the photoconductive belt to record an electrostatic latent image thereon corresponding to the greyscale image signals received from ESS 28.

After the electrostatic latent image has been recorded on photoconductive surface 12, belt 10 advances the latent image to a development station C, where toner, in the form of liquid or dry particles, is electrostatically attracted to the latent image using commonly known techniques. At development station C, a magnetic brush development system, indicated by reference numeral 38, advances developer material into contact with the latent image. Magnetic brush development system 38 includes two magnetic brush developer rollers 40 and 42. Rollers 40 and 42 advance developer material into contact with the latent image. These developer rollers form a brush of carrier granules and toner particles extending outwardly therefrom. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

Figure 2:
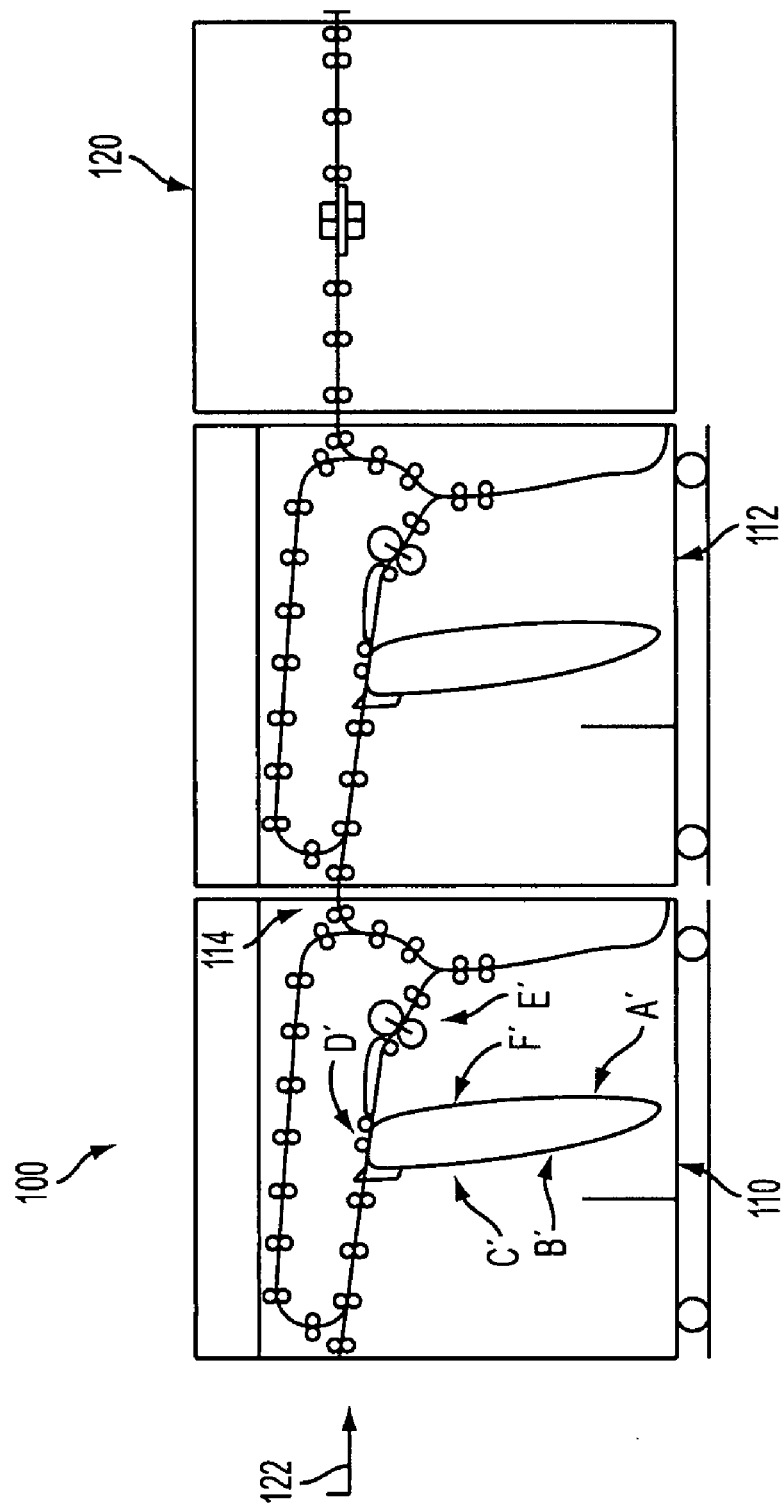
FIG. 2 is a sectional view showing an arrangement of image marking engines.

With continued reference to FIG. 1, after the electrostatic latent image is developed, the toner powder image present on belt 10 advances to transfer station D. A print sheet 48 is advanced to the transfer station D by a sheet feeding apparatus 50. It is to be appreciated that the sheet feeding apparatus can be receiving sheets from one marking engine and moving same sheets to another marking engine (FIG. 2). The sheet feeding apparatus 50 in one example, can include a nudger roll 52 contacting the uppermost sheet of stack 54. Nudger roll 52 rotates to advance the uppermost sheet from stack 54 to a retard feeder assembly 80 which includes a drive roll or feed roll 82 and a retard roll 84 for forwarding sheets into chute 56. Chute 56 directs the advancing sheet of support material into contact with photoconductive surface 12 of belt 10 in a timed sequence so that the toner powder image formed thereon contacts the advancing sheet at transfer station D. Transfer station D can include a corona generating device 58 which sprays ions onto the back side of sheet 48. This attracts the toner powder image from photoconductive surface 12 to sheet 48. After transfer, sheet 48 continues to move in the direction of arrow 60 onto a conveyor (not shown) which advances sheet 48 to fusing station E. The fusing station E includes a fuser assembly, indicated generally by the reference numeral 62, which permanently affixes the transferred powder image to sheet 48. Fuser assembly 60 includes a heated fuser roller 64 and a back-up roller 66. Sheet 48 passes between fuser roller 64 and back-up roller 66 with the toner powder image contacting fuser roller 64. In this manner, the toner powder image is permanently affixed to sheet 48. After fusing, sheet 48 advances through chute 68 to catch tray 72 for subsequent removal from the printing machine by the operator. After the print sheet is separated from photoconductive surface 12 of belt 10, the residual toner/developer and paper fiber particles adhering to photoconductive surface 12 are removed therefrom at cleaning station F. Cleaning station F includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

It is believed that the description above is sufficient for purposes of the present application to illustrate the general operation of an electrophotographic printing machine incorporating the features of the present disclosure therein.

Referring to FIG. 2, wherein similar elements are identified with a single prime (') suffix and new elements are identified with new numerals. FIG. 2 displays a printing system 100 having a modular or serial architecture is shown which employs a horizontal frame structure that can hold at least two marking engines 110, 112 in a tandem configuration 114. This serial tandem system can feed sheets directly from one engine 110 to the other 112, with or without inversion. It is to be appreciated that the architecture can be a vertical frame structure. The horizontal and vertical structures can comprise any number of marking engines.

Typically, when two tandem engines are running in a first operational mode, in serial configuration, if one engine fails or experiences problems, then both engines become inoperative until service arrives. A control system having failure detection software can be provided in this situation, which allows detection of specified types of failure conditions and then automatically driving the offending and compromised engine into a pass-through or second operating mode. Unique modes of operation, such as passing paper with the fuser opened (or "un-cammed") and/or cooled can be accomplished with the control system by adjusting the compromised engine accordingly. The specified types of failures can be of the type that do not affect the pass-through path and which allow access to un-utilized subsystems, for example, the fuser. For example, the types of failures can be selected form the group involving the charging station A, exposure station B', ROS, development station C', transfer station D', fusing station E' and/or cleaning station F''. In this second operational mode, the offending engine would go into pass-through mode whereby media sheets can pass though its paper path and onto the engine that is still functioning properly or onto a finishing device 120. The second operational mode can be maintained until service arrives.

The control system can either detect the appropriate failure conditions in the offending engine and automatically go into paper pass through mode or could be directed by the operator to pass through the specified engine. Because both engines can have a duplex paper path, both simplex and duplex operation can continue using a single engine. In normal operation, i.e. the first operational mode, the simplex path of each engine can be used. The control system can detect whether a given failure prevents an engine from passing paper. If no, then the required elements of the "failed" engine can remain 'active' to pass media sheets through to, or from, the operable engine. This pass-through mode could optionally involve opening and/or cooling the fuser nip. The system, now changed to the second operational mode, allows the 'degraded' system to continue until service can arrive thereby allowing continued operation.

The architecture, described above, enables the use of multiple marking engines within the same system and can provide the capability for single pass duplexing, internal pass duplexing, and multi-pass printing in the first operating mode. Single pass duplexing refers to a system in which side 1 of a sheet is printed on one marking engine, and side 2 is printed on a second marking engine instead of recirculating the sheet back into the first engine. In contrast, internal pass duplexing refers to a system in which side 1 and side 2 are printed on a single marking engine wherein the sheet is recirculated back into the same engine for printing of side 2. Multi-pass printing refers to a system in which side one of a sheet is printed on one marking engine, and the same side one is printed on a second marking engine.

The media path includes entrance and exit media paths which allow sheets from one marking engine to be fed to another marking engine, either in an inverted or in a non-inverted orientation. The media path can also involve an internal duplex loop within one marking engine which is optionally provided so that duplex printing can continue even when one or more of the other marking engines are inoperative, i.e. second operating mode.

The described architecture enables a wide range of marking engines in the same system. As described above, the marking engines can involve a variety of types and processing speeds. The modular architecture can provide redundancy for marking engines and paths and can provide internal duplex loops for backup. The architecture can utilize a single media source 122 on the input side and a single output merging module 120 on the output side The exemplary embodiments have been described with reference to the specific embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. An integrated printing system comprising:
a first image marking engine;
a second image marking engine;
said first and said second image marking engines serially arranged with one another in a first operating mode;
said first operating mode includes marking and passing of media to and from said first and second image marking engine;
a control system for detecting a failure within one of said first and said second image marking engines; and,
a second operating mode wherein said control system detects said failure and enables passing of said media through one of said first and second image marking engine and marking of said media in another of said first and second image marking engine when said failure is of a specified type.

2. The integrated printing system of claim 1, wherein said failure is of a specified type selected from the group consisting of charging, exposing ROS, developing, transferring, fusing, and cleaning failures.

3. The integrated printing system of claim 2, wherein said second operating modes includes cooling a fuser in one of said first and second image marking engines.

4. The integrated printing system of claim 1, wherein said second operating mode includes opening a fuser in said one of said first and second image marking engines.

5. The integrated printing system of claim 4, wherein said second operating mode includes cooling said fuser.

6. The integrated printing system of claim 1, wherein said second operating mode includes cooling a fuser in one of said first and second image marking engines.

7. The integrated printing system of claim 1, further including at least one media feed source for introducing media into said printing system.

8. The integrated printing system of claim 1, further including at least one media finishing portion for receiving said sheets from said printing system.

9. The integrated printing system of claim 1, wherein said first image marking engine is a first type and said second image marking engine is a second type.

10. The integrated printing system of claim 1, wherein said first and second marking engines each include an internal duplex loop, such that when one of said first and second marking engines experiences a failure, the other of said first and second marking engines continues in both a simplex and a duplex mode.

11. A method of printing media for an integrated printing system, the method comprising:
providing a first image marking engine and a second image marking engine, said first and said second image marking engines serially arranged with one another in a first operating mode;
feeding media from a feed source into at least one of said first and second image marking engines during a first operating mode, said first operating mode including marking and passing of the media through said first and second marking engines; and,
changing to a second operating mode including marking of the media through one of said first and second image marking engines and passing the media through both of said first and second image marking engines.

12. The method of printing media according to claim 11, further comprising: providing a control system for detecting a failure within one of said first and said second image marking engines wherein said control system enables said second operating mode upon detecting said failure.

13. The method of printing medial according to claim 11, wherein enabling said second operating mode further includes opening a fuser in said one of said first and second image marking engines.

14. The method of printing medial according to claim 13, wherein enabling said second operating mode further includes cooling said fuser.

15. The method of printing media according to claim 11, wherein enabling said second operating mode further includes cooling a fuser in one of said first and second image marking engines.

16. The method of printing media according to claim 11, further comprising: arranging said first image marking engine and said second image marking engine in a serial configuration with one another.

17. An integrated printing system comprising:
a first image marking engine;

a second image marking engine;

said first and said second image marking engines serially arranged with one another and having a first operating mode;

said first operating mode including marking and passing of media to and from said first and second image marking engines; and, a second operating mode including passing of said media through one of said first and second image marking engines and marking of said media in another of said first and second image marking engines.

18. The integrated printing system of claim 17, further including a control system for detecting a failure within one of said first and said second image marking engines; and, said failure is of a specified type selected from the group consisting of charging, exposing, ROS, developing, transferring, fusing, and cleaning failures.

19. The integrated printing system of claim 17, wherein said second operating mode includes opening a fuser in said one of said first and second image marking engines.

20. The integrated printing system of claim 19, wherein said second operating mode includes cooling said fuser.

21. The integrated printing system of claim 17, wherein said second operating mode includes cooling a fuser in one of said first and second image marking engines.

* * * * *